(12) United States Patent
Shimbori et al.

(10) Patent No.: US 11,325,034 B2
(45) Date of Patent: May 10, 2022

(54) GAME PROCESSING METHOD INCLUDING DRAWING CHARACTER OBJECT AND CLOTHING OBJECT AND RECORDING MEDIUM FOR STORING GAME PROGRAM

(71) Applicant: Koei Tecmo Games Co., Ltd., Yokohama (JP)

(72) Inventors: Yohei Shimbori, Yokohama (JP); Motohiro Shiga, Yokohama (JP)

(73) Assignee: KOEI TECMO GAMES CO., LTD., Yokohama (JP)

( * ) Notice: Subject to any disclaimer, the term of this patent is extended or adjusted under 35 U.S.C. 154(b) by 364 days.

(21) Appl. No.: 16/595,478

(22) Filed: Oct. 8, 2019

(65) Prior Publication Data
US 2020/0108314 A1 Apr. 9, 2020

(30) Foreign Application Priority Data
Oct. 9, 2018 (JP) .............................. JP2018-190730

(51) Int. Cl.
| | | |
|---|---|---|
| *G06T 19/20* | (2011.01) | |
| *A63F 13/52* | (2014.01) | |
| *A63F 13/79* | (2014.01) | |
| *G06T 11/00* | (2006.01) | |
| *G06T 13/40* | (2011.01) | |

(52) U.S. Cl.
CPC .............. *A63F 13/52* (2014.09); *A63F 13/79* (2014.09); *G06T 19/20* (2013.01); *A63F 2300/6653* (2013.01); *G06T 11/001* (2013.01); *G06T 13/40* (2013.01); *G06T 2210/16* (2013.01)

(58) Field of Classification Search
None
See application file for complete search history.

(56) References Cited

U.S. PATENT DOCUMENTS

| 10,963,939 B1* | 3/2021 | Zehr ................... G06K 9/6256 |
|---|---|---|
| 2009/0150778 A1* | 6/2009 | Nicol, II ................. A63F 13/10 |
| | | 715/706 |

FOREIGN PATENT DOCUMENTS

| JP | 2012-223306 | 11/2012 |
|---|---|---|
| JP | 2017-134609 | 8/2017 |

OTHER PUBLICATIONS

Japanese Office Action for corresponding JP Application No. 2018-190730, dated Mar. 27, 2020 (w/ English machine translation).

\* cited by examiner

*Primary Examiner* — Vu Nguyen
(74) *Attorney, Agent, or Firm* — Mori & Ward, LLP

(57) ABSTRACT

A game processing method executed by an information processing device includes obtaining information on a character object, obtaining information on a clothing object worn by the character object, obtaining information on clothing area including an area exposed from the clothing object, the clothing area being set to skin of the character object, setting drawing setting of the clothing area to first drawing setting for drawing as the skin or to second drawing setting for drawing as clothing, and drawing the character object and the clothing object based on the information on the character object, the information on the clothing object, and the drawing setting.

10 Claims, 12 Drawing Sheets

[FIG. 1]
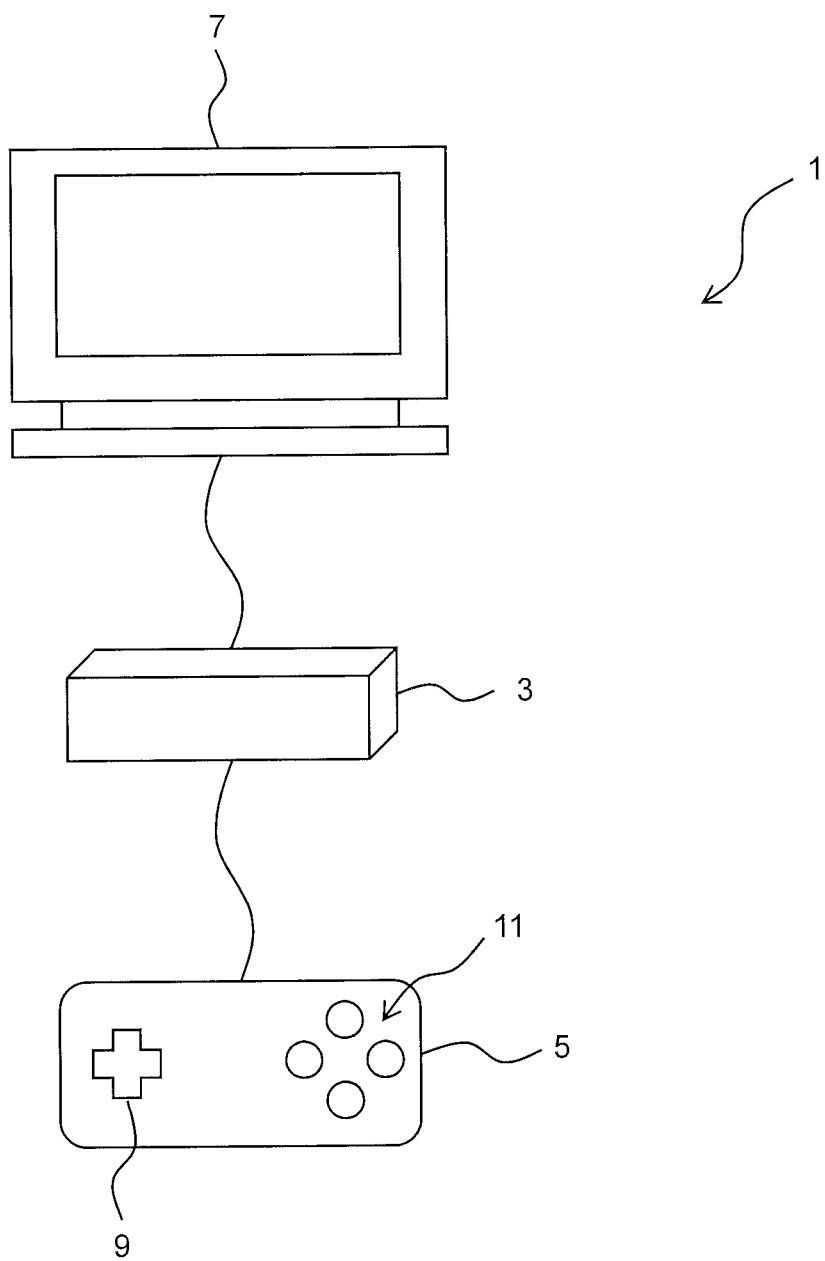

[FIG. 2]
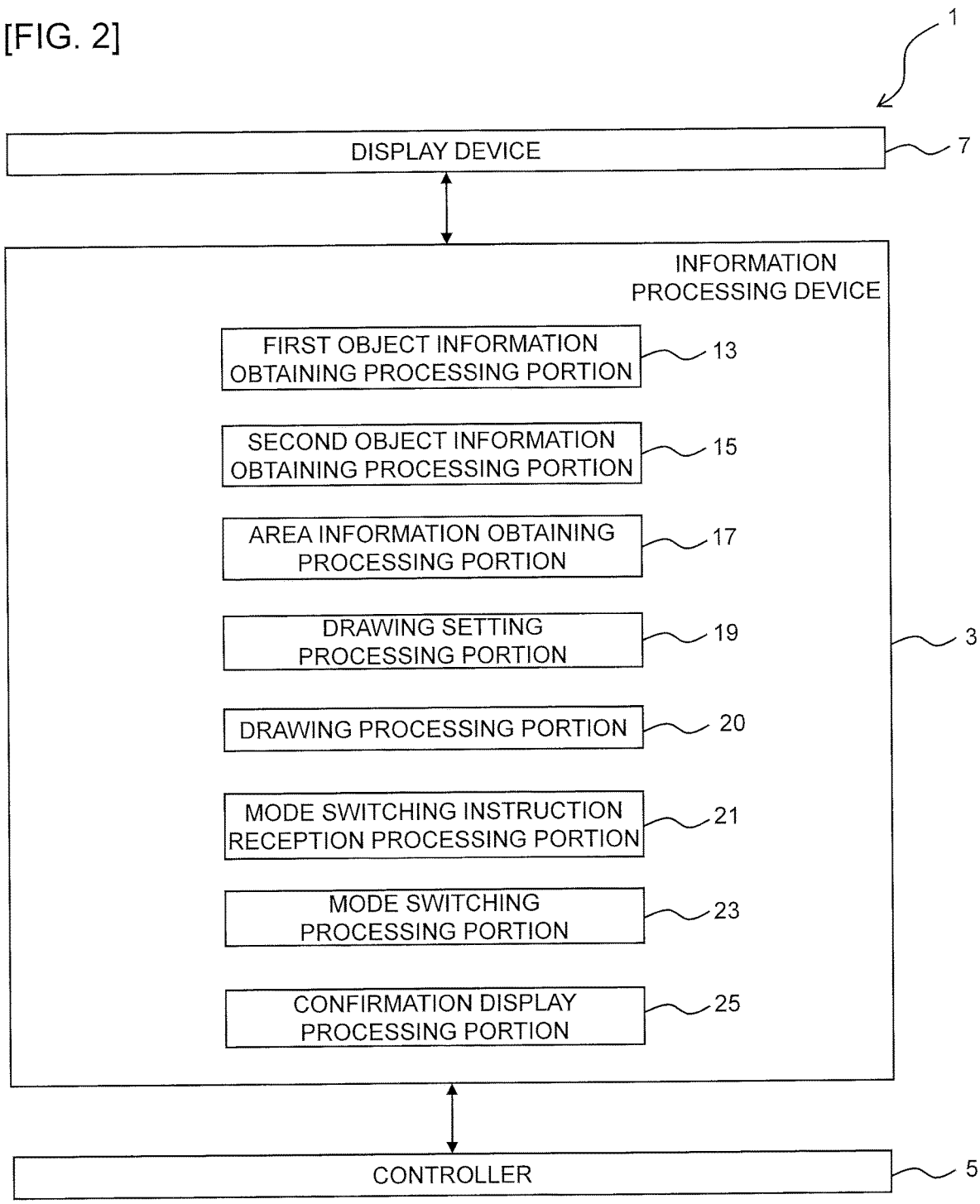

[FIG. 3]
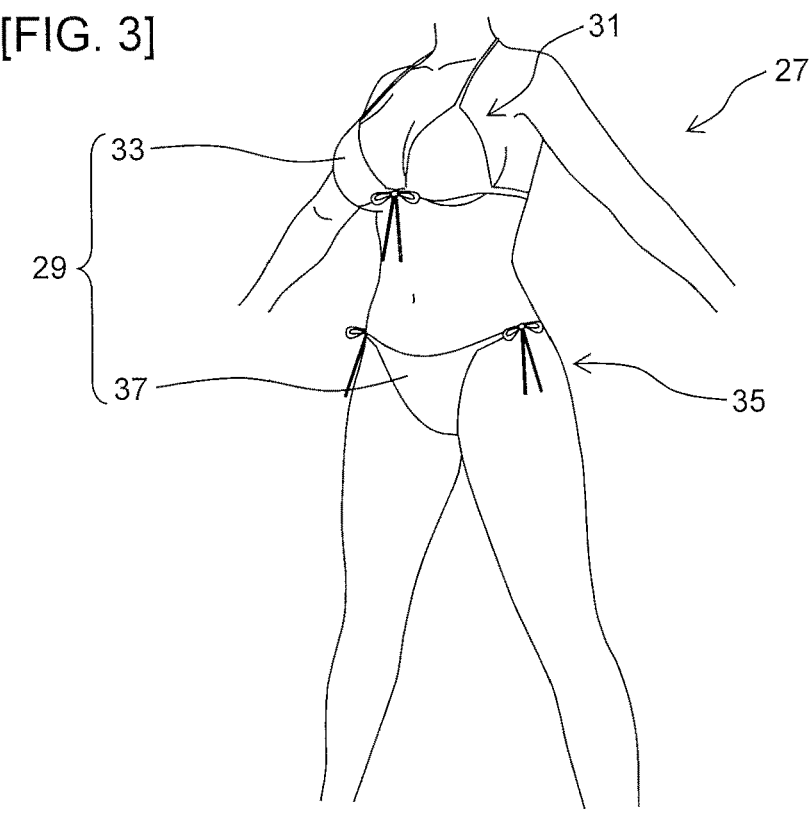
[FIG. 4]
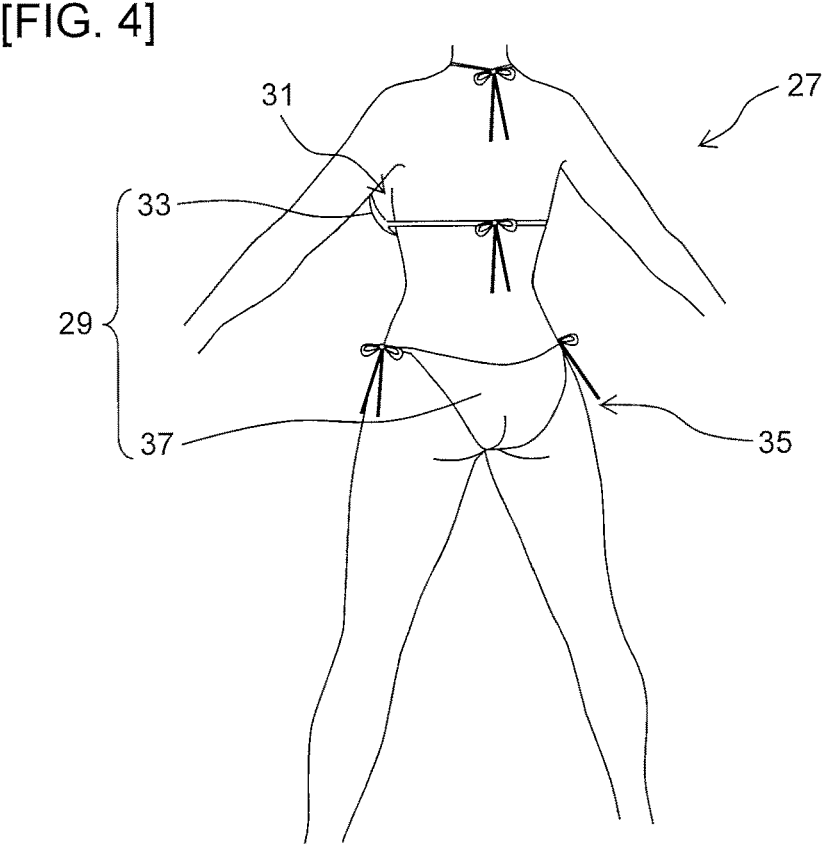

[FIG. 5]
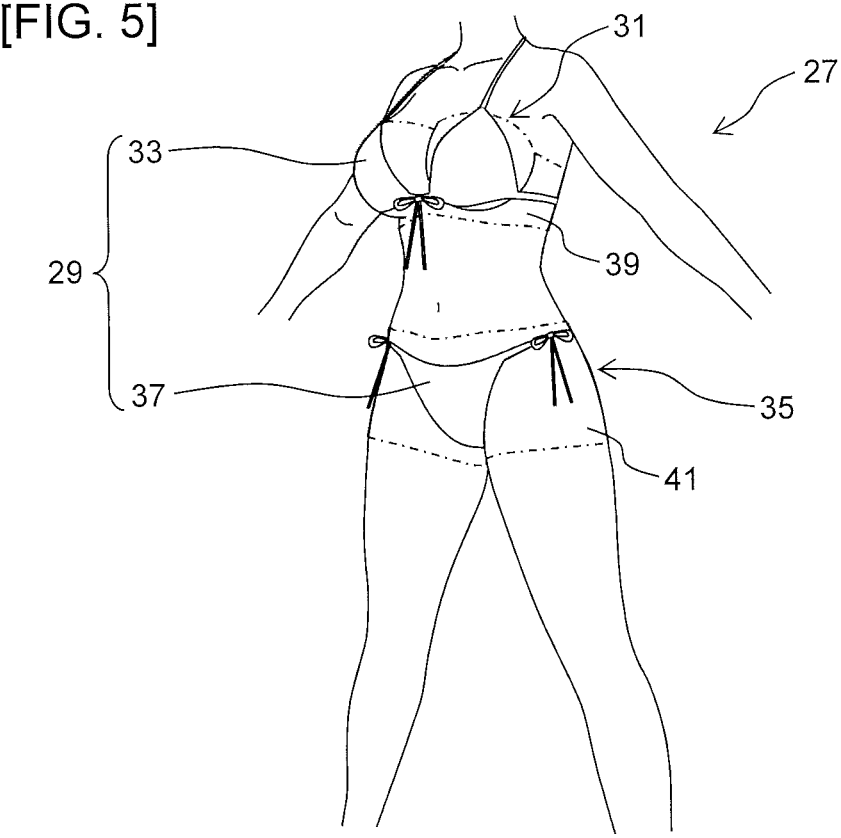
[FIG. 6]
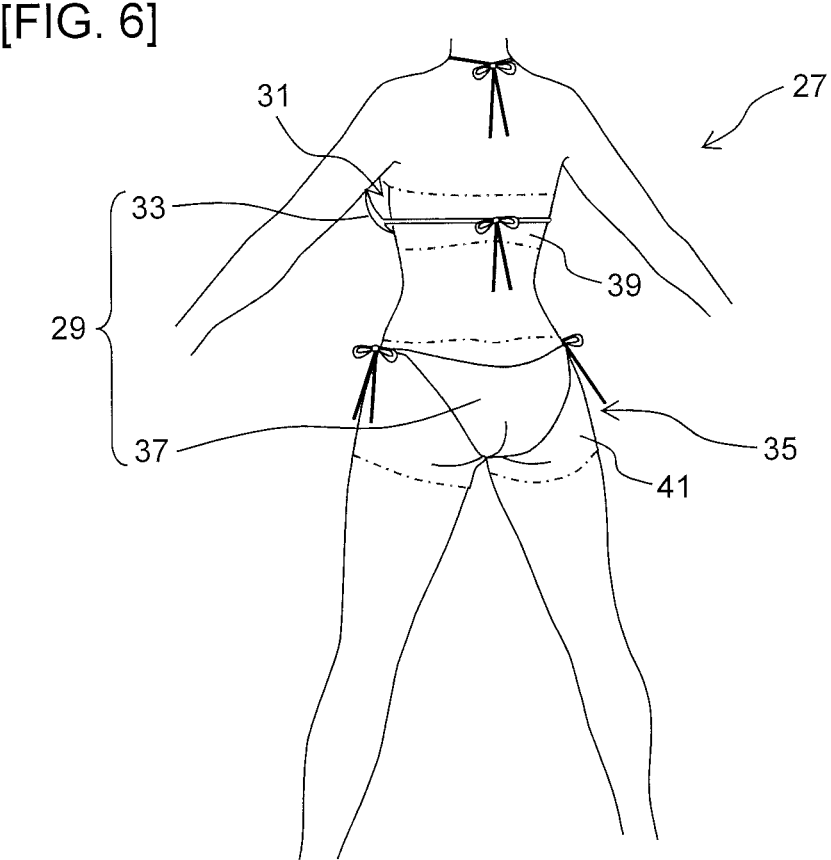

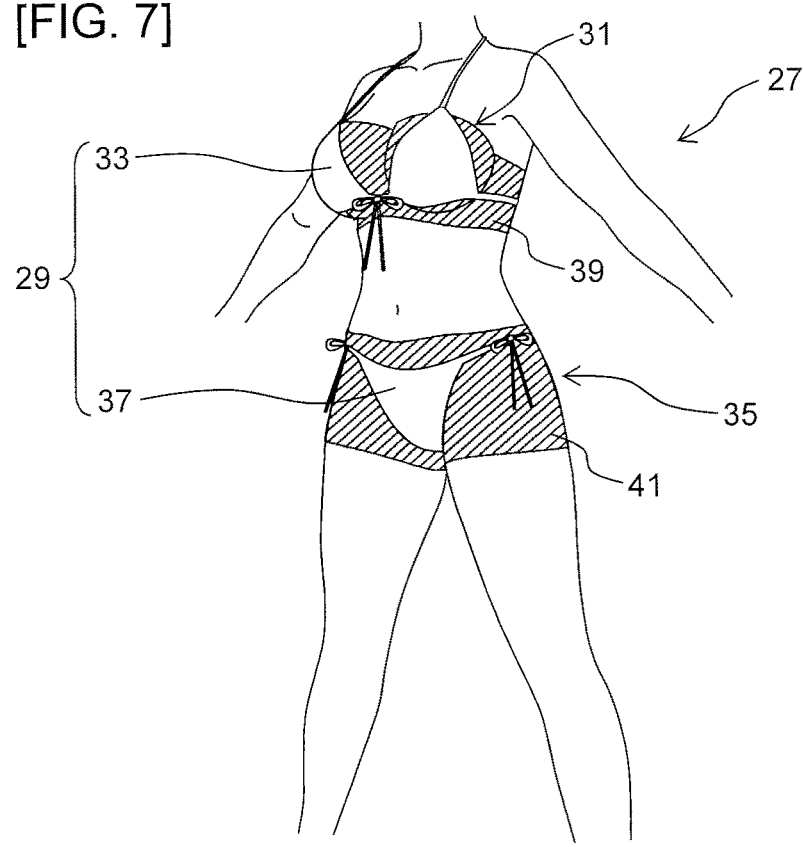
[FIG. 7]
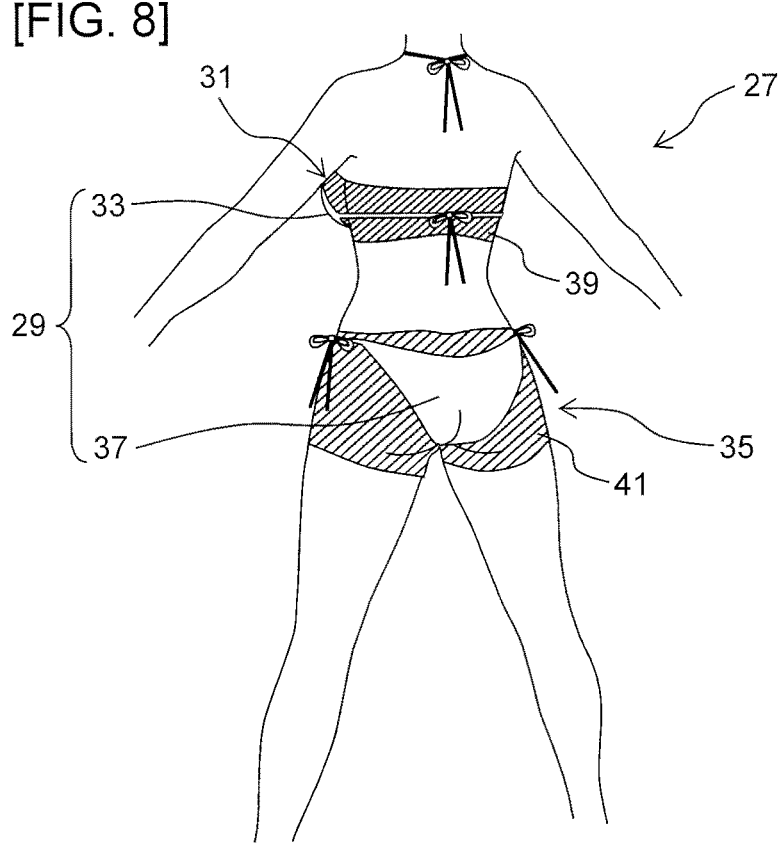
[FIG. 8]

[FIG. 9]

ONCE TURN ON LOW-EXPOSURE MODE,
CLOTHING IS DISPLAYED UNDER COSTUME OF
CHARACTER.

SATISFIED?   [ YES ]   [ NO ]

[FIG. 10]
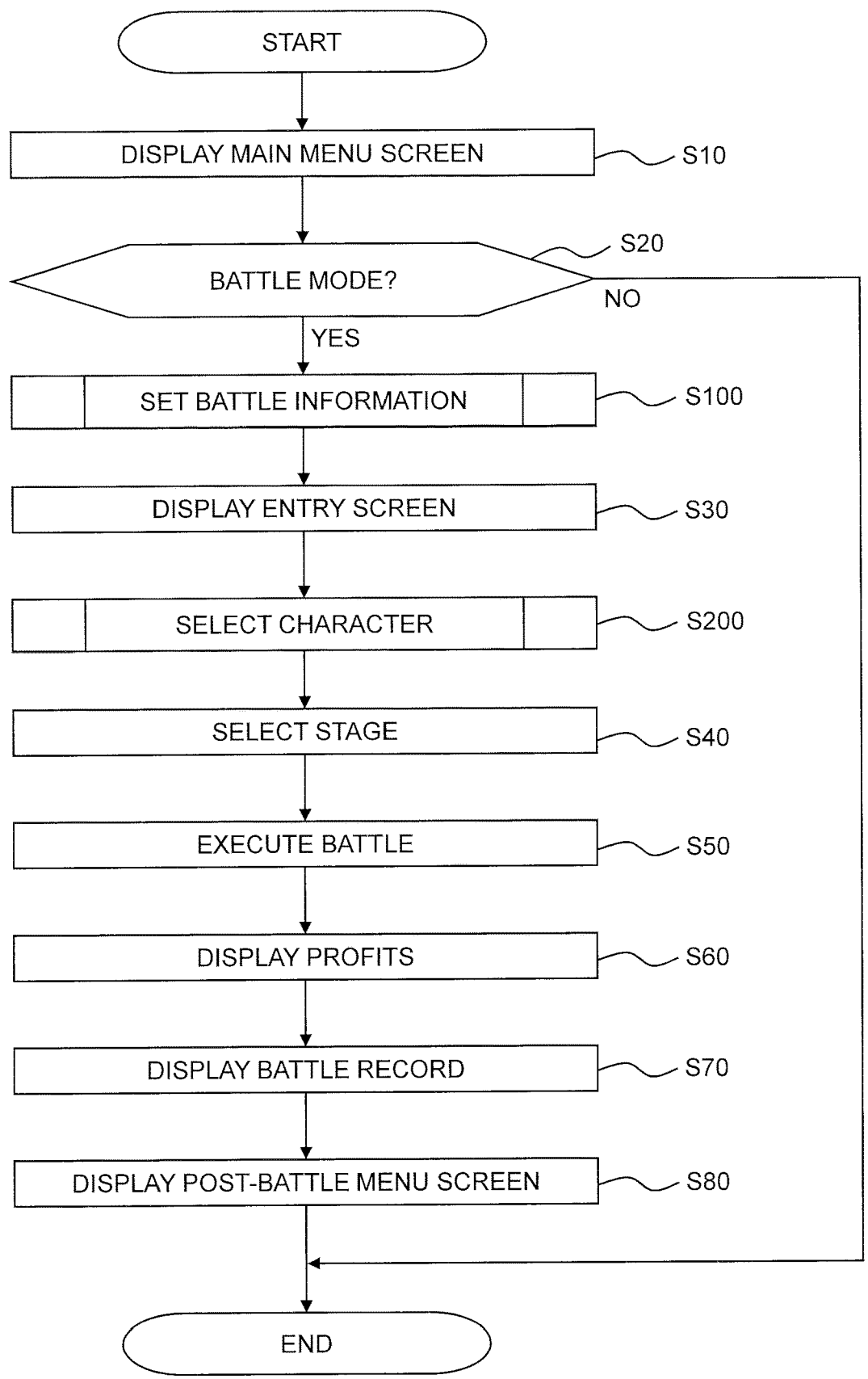

[FIG. 11]
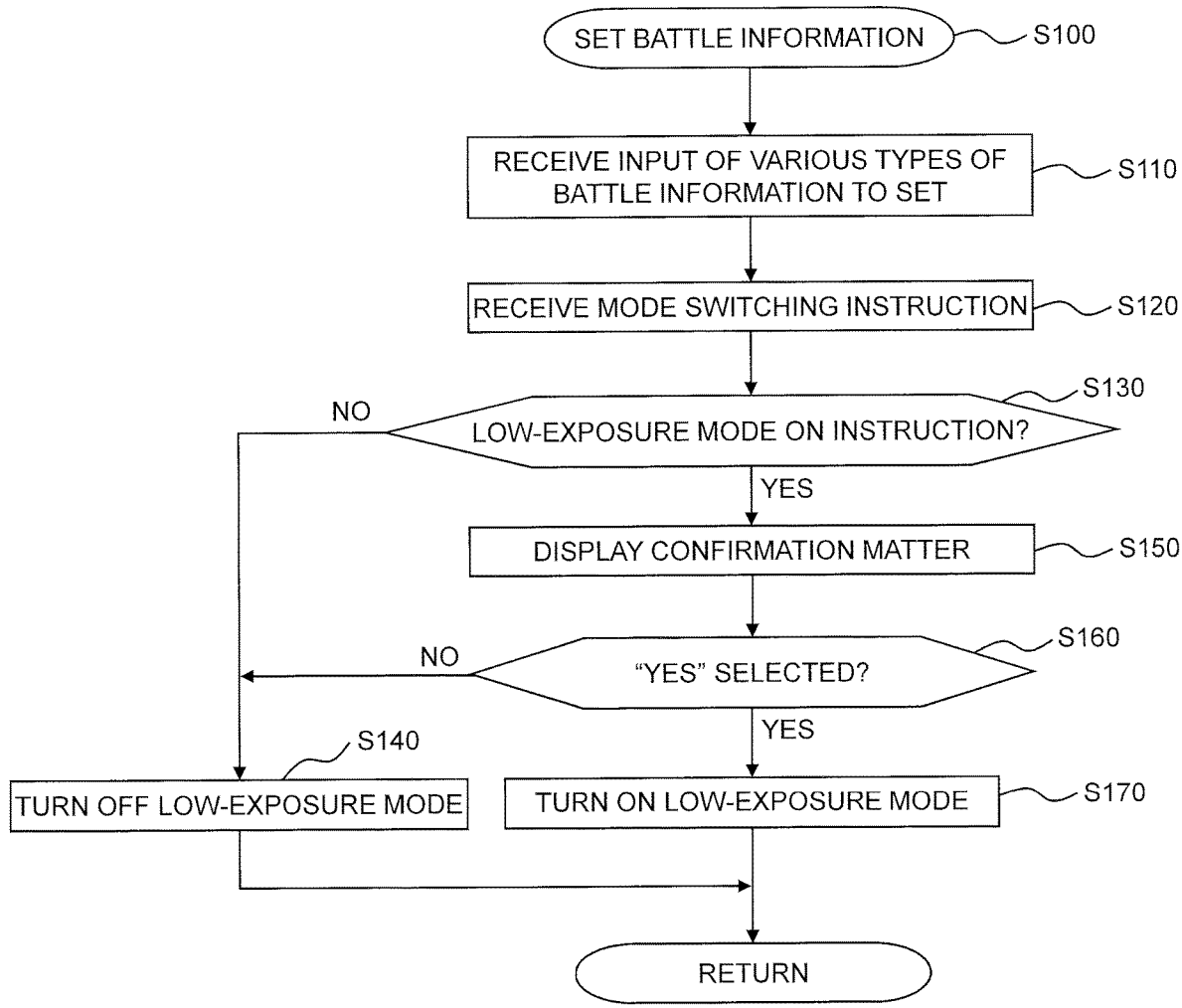

[FIG. 12]
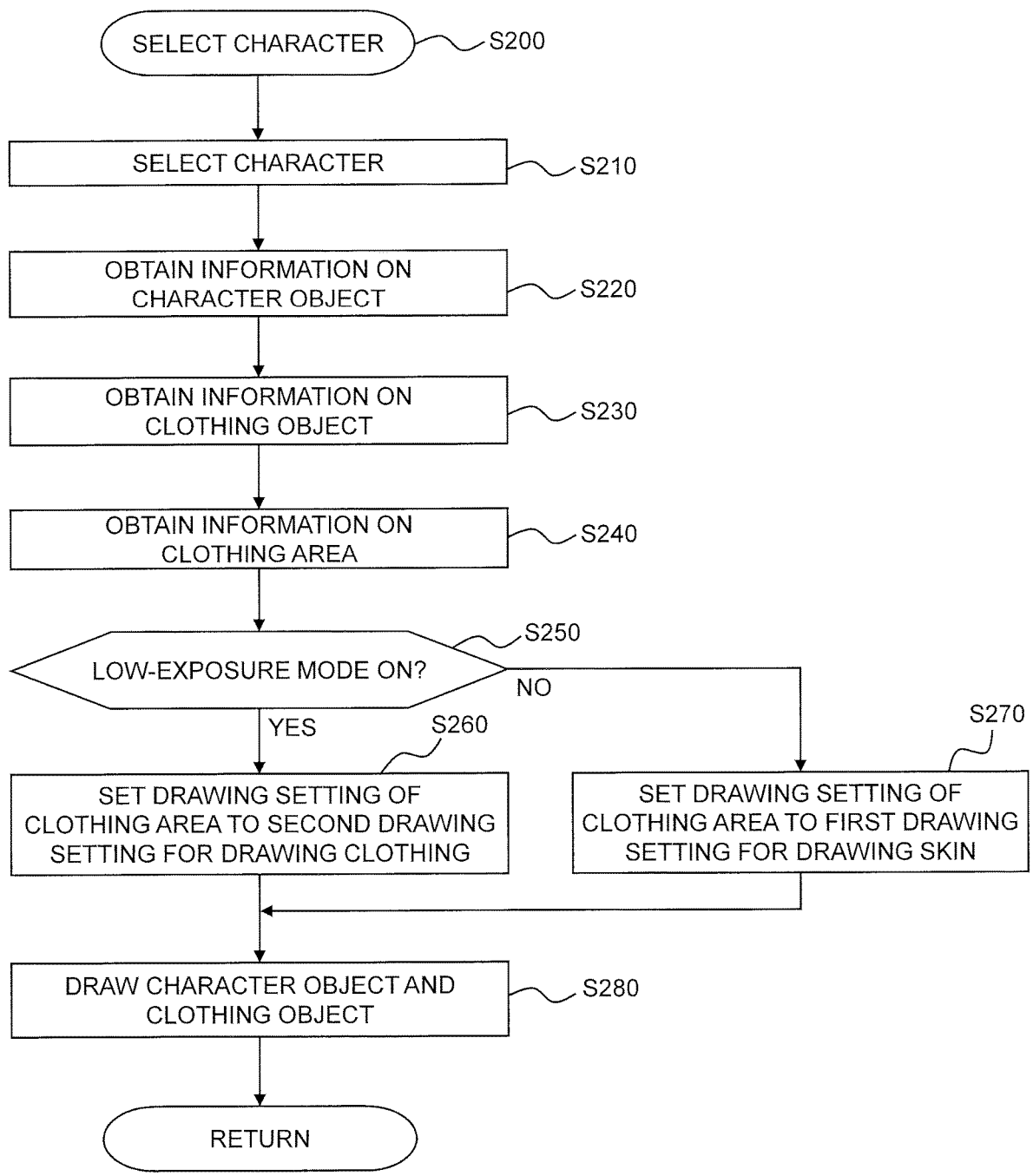

[FIG. 13]
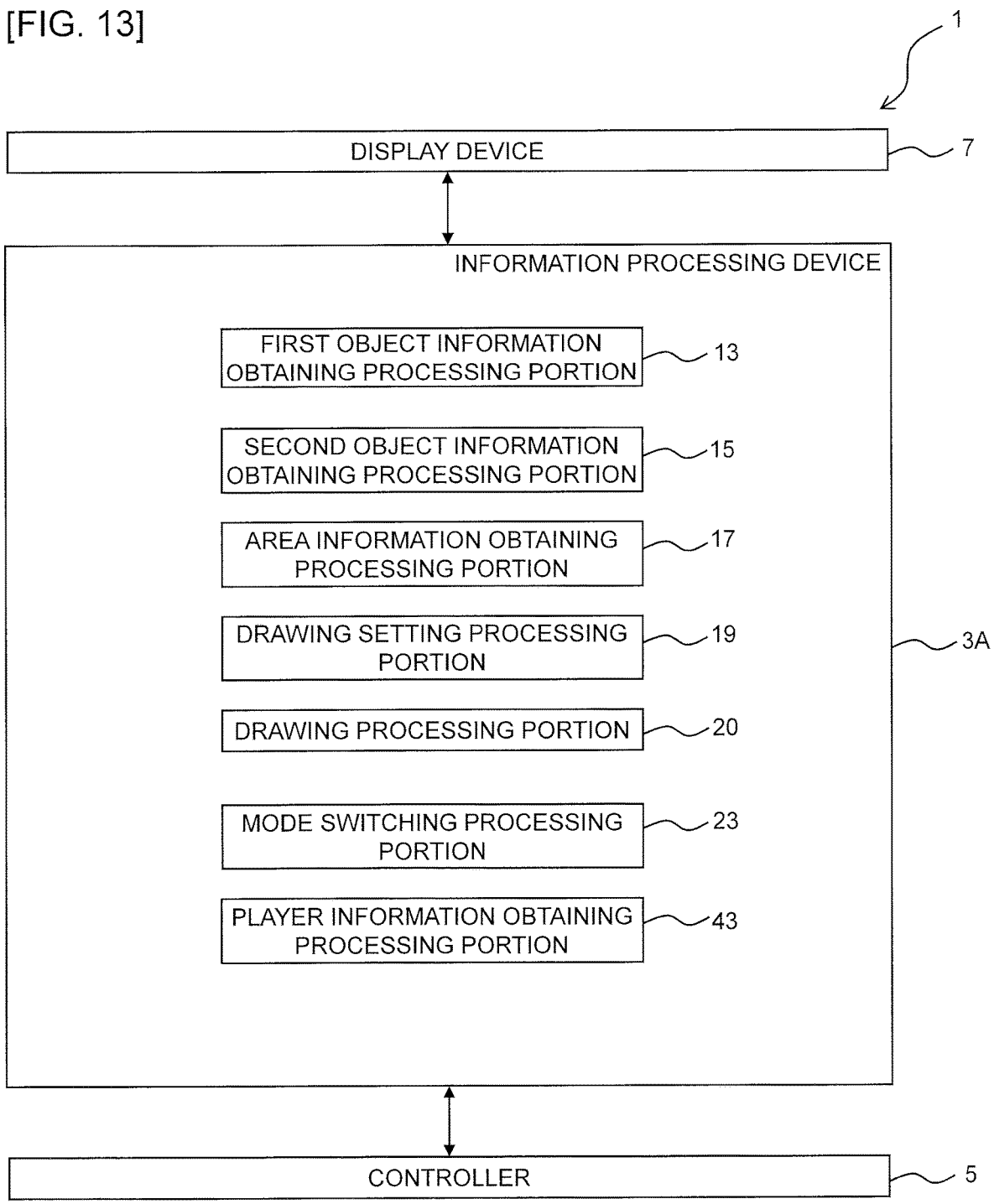

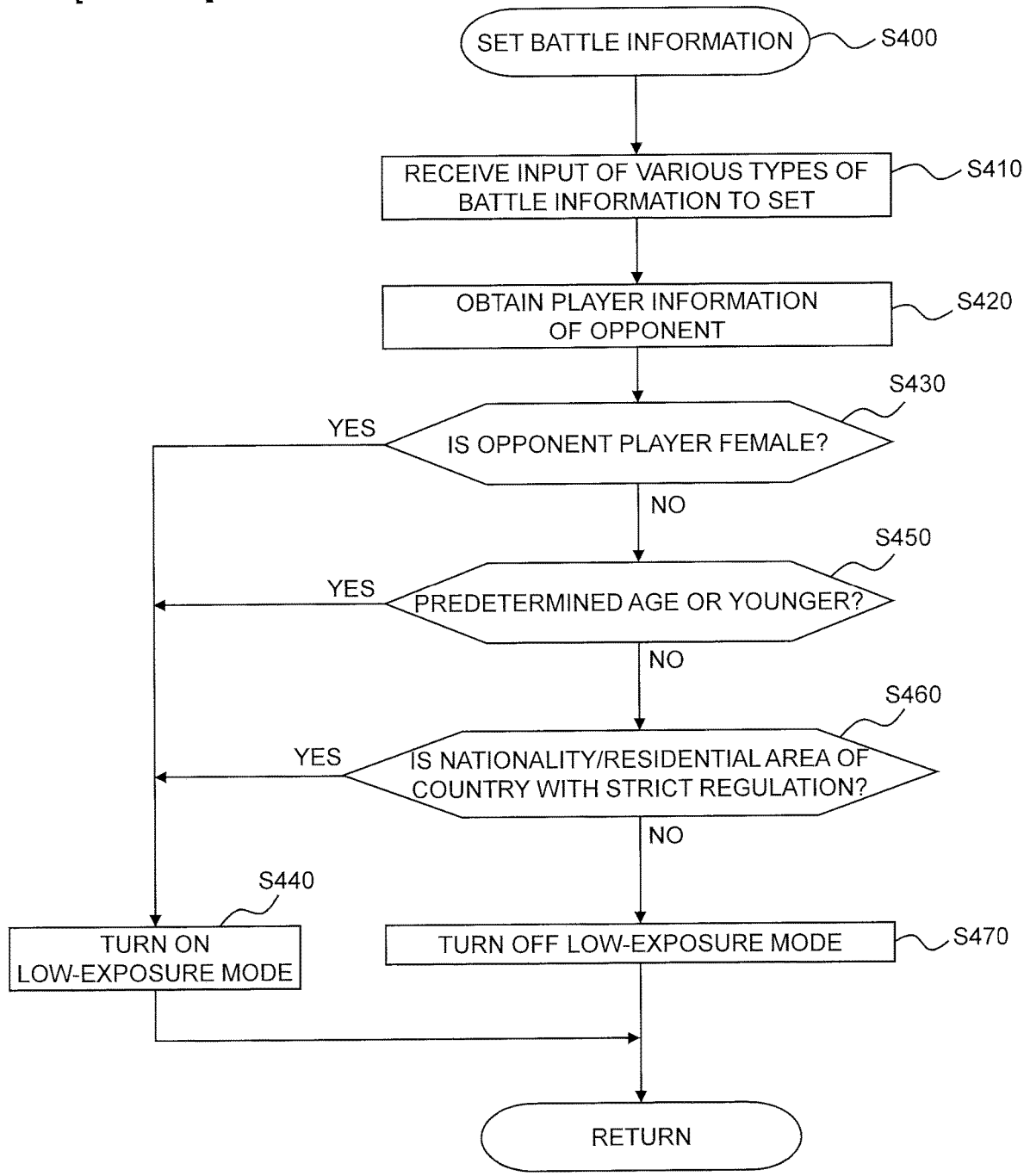

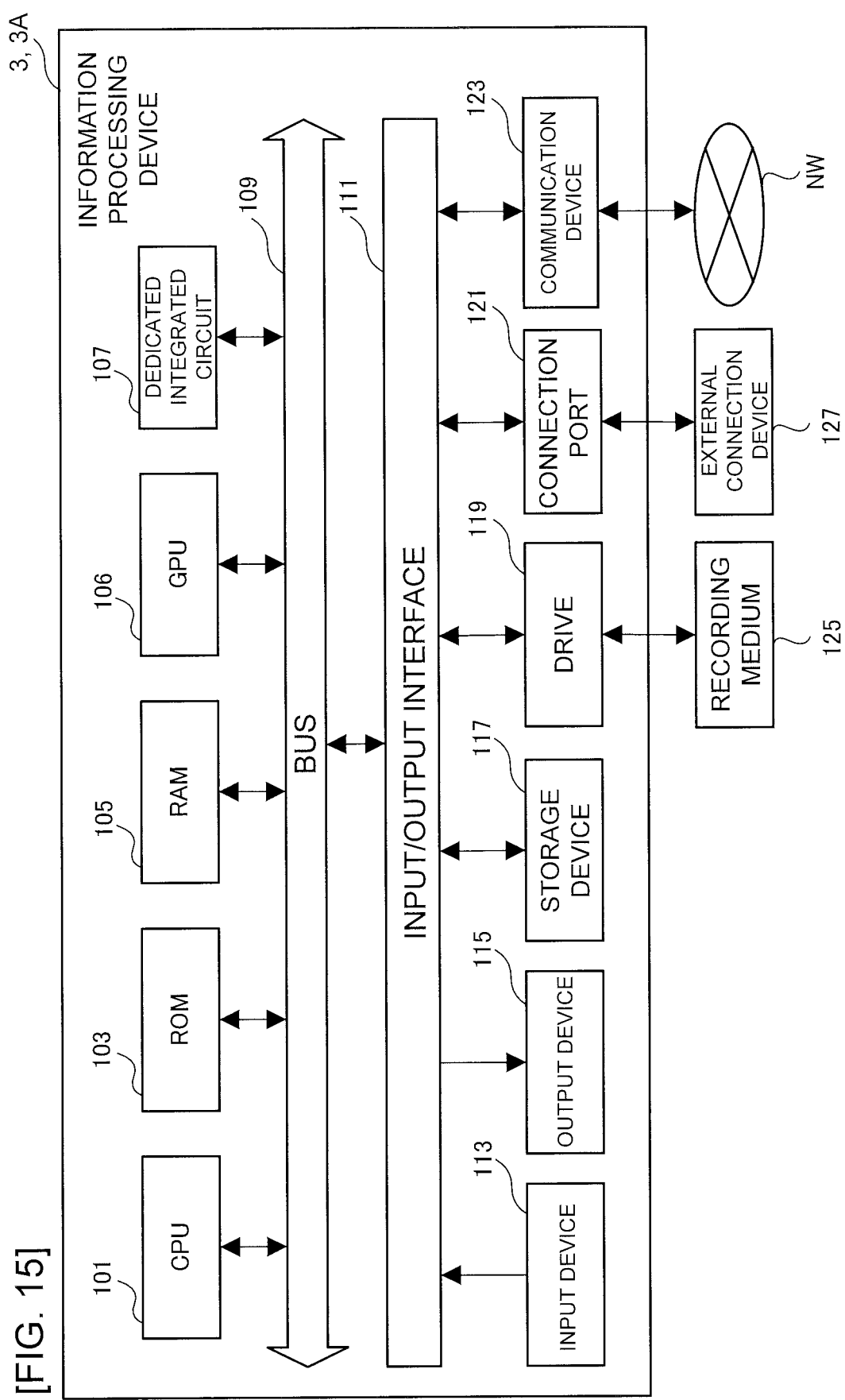
[FIG. 15]

GAME PROCESSING METHOD INCLUDING DRAWING CHARACTER OBJECT AND CLOTHING OBJECT AND RECORDING MEDIUM FOR STORING GAME PROGRAM

CROSS-REFERENCE TO RELATED APPLICATION

The present application is based upon and claims the benefit of priority to Japanese Patent Application No. 2018-190730, filed Oct. 9, 2018. The entire contents of this application are incorporated herein by reference.

BACKGROUND OF THE INVENTION

Field of the Invention

The present invention relates to a game processing method and a recording medium.

Description of Background Art

JP, A, 2017-134609 describes a game in which a female model wearing a swimming suit appears as a character in the game, for example.

SUMMARY OF THE INVENTION

In the game, a player operates a controller and causes the female model wearing a swimming suit to perform various actions. However, in the case that live video of the game, for example, is delivered or the game character is made to participate in a battle game, for example, there is a need to temporarily restrict exposure of skin of the game character by considering viewing by general public, attributes of opponent players and the like. In the prior art, such needs cannot be satisfied.

The present invention was made in view of such problems and has an object to provide a game processing method and a recording medium which can temporarily restrict exposure of the skin of the game character.

Means for Solving the Problem

According to one aspect of the present invention, a game processing method executed by an information processing device includes obtaining information on a character object, obtaining information on a clothing object worn by the character object, obtaining information on clothing area including an area exposed from the clothing object, the clothing area being set to skin of the character object, setting drawing setting of the clothing area to first drawing setting for drawing as the skin or to second drawing setting for drawing as clothing, and drawing the character object and the clothing object based on the information on the character object, the information on the clothing object, and the drawing setting.

According to another aspect of the present invention, a non-transitory recording medium readable by an information processing device, the recording medium storing a game program programmed to cause the information processing device to obtain information on a character object, obtain information on a clothing object worn by the character object, obtain information on clothing area including an area exposed from the clothing object, the clothing area being set to skin of the character object, set drawing setting of the clothing area to first drawing setting for drawing as the skin or to second drawing setting for drawing as clothing, and draw the character object and the clothing object based on the information on the character object, the information on the clothing object, and the drawing setting.

Advantages of the Invention

According to the game processing method and the recording medium of the present invention, exposure of the skin of the game character can be temporarily restricted.

BRIEF DESCRIPTION OF THE DRAWINGS

FIG. 1 is a system configuration diagram illustrating an example of entire configuration of a game system according to an embodiment;

FIG. 2 is a block diagram illustrating an example of functional configuration of an information processing device;

FIG. 3 is an explanatory view illustrating an example of a drawing of a character object and a clothing object in the case that drawing setting of a clothing area is set to first drawing setting;

FIG. 4 is an explanatory view illustrating an example of a drawing of the character object and the clothing object in the case that drawing setting of the clothing area is set to the first drawing setting;

FIG. 5 is an explanatory view illustrating an example of the clothing area;

FIG. 6 is an explanatory view illustrating an example of the clothing area;

FIG. 7 is an explanatory view illustrating an example of a drawing of the character object and the clothing object in the case that drawing setting of the clothing area is set to second drawing setting;

FIG. 8 is an explanatory view illustrating an example of a drawing of the character object and the clothing object in the case that drawing setting of the clothing area is set to the second drawing setting;

FIG. 9 is an explanatory view illustrating an example of display of a confirmation matter;

FIG. 10 is a flowchart illustrating an example of a processing procedure executed by a CPU of the information processing device;

FIG. 11 is a flowchart illustrating an example of the processing procedure of battle information setting processing;

FIG. 12 is a flowchart illustrating an example of the processing procedure of character selection processing;

FIG. 13 is a block diagram illustrating an example of the functional configuration of the information processing device in a variation in which on/off of a low-exposure mode is automatically switched;

FIG. 14 is a flowchart illustrating an example of the processing procedure of the battle information setting processing in the variation in which on/off of the low-exposure mode is automatically switched; and FIG. 15 is a block diagram illustrating an example of hardware configuration of the information processing device.

DETAILED DESCRIPTION OF THE EMBODIMENTS

An embodiment of the present invention will be described below by referring to drawings.

1. Entire Configuration of Game System

First, an example of entire configuration of a game system 1 according to this embodiment will be described by using FIG. 1. As illustrated in FIG. 1, the game system 1 has an information processing device 3, a controller 5, and a display device 7. Each of the controller 5 and the display device 7 is connected to the information processing device 3, capable of communication. Note that though FIG. 1 illustrates a case of wired connection, connection may be realized wirelessly.

The information processing device 3 is a stationary type game machine, for example. However, this is not limiting, and it may be a portable game machine integrally including an input portion, a display portion and the like, for example. Moreover, other than the game machine, it may be one of those manufactured, sold and the like as computers such as a server computer, a desktop type computer, a laptop computer, a tablet computer and the like or those manufactured, sold and the like as telephone sets such as a portable phone, a smart phone, a phablet and the like.

A player performs various operation inputs by using the controller 5. In an example illustrated in FIG. 1, the controller 5 has a cross key 9, a plurality of buttons 11 and the like, for example. Note that instead of or in addition to the above, the controller 5 may have a joy stick, a touch pad and the like, for example.

2. Functional Configuration of Information Processing Device

Subsequently, an example of functional configuration of the information processing device 3 will be described by using FIGS. 2 and 3-9.

As illustrated in FIG. 2, the information processing device 3 has a first object information obtaining processing portion 13, a second object information obtaining processing portion 15, an area information obtaining processing portion 17, a drawing setting processing portion 19, a drawing processing portion 20, a mode switching instruction reception processing portion 21, a mode switching processing portion 23, and a confirmation display processing portion 25.

The first object information obtaining processing portion 13 obtains information on a character object. The information on the character object is image information of a 2D model, a 3D model or the like, for example. The first object information obtaining processing portion 13 may obtain the information read out of a game program and recorded in a RAM 105 of the information processing device 3 or a recording device 117 and the like (see FIG. 15 which will be described later) or may directly obtain information read out of the game program.

Note that the character object may be a player character operated by the player or may be a non-player character automatically controlled by a predetermined algorithm (so-called game AI) regulated by the game program. A type of the character object is not particularly limited but includes objects such as a human male character, a human female character, an animal character other than human being, a virtual living body character other than human being or animals and the like. In this embodiment, a case of a female character object is described as an example.

The second object information obtaining portion 15 obtains information on a clothing object worn by the character object. The information on the clothing object is image information of the 2D model, the 3D model or the like, for example. The second object information obtaining processing portion 15 may obtain the information read out of the game program and recorded in the RAM 105 of the information processing device 3 or the recording device 117 and the like (see FIG. 15 which will be described later) or may directly obtain information read out of the game program.

The clothing object is drawn as an object separate from the character object. A type of the clothing object is not particularly limited but includes a swimming suit, an underwear, western clothes, Kimono, a uniform, pajamas, a leotard, a Chinese dress, a battle uniform, a combat uniform, a Ninja uniform, a housemaid uniform, and a wide variety of other costumes, for example.

The area information obtaining processing portion 17 obtains information on a clothing area including an area exposed from the clothing object set on the skin of the character object. The information on the clothing area is set in advance and incorporated in the information on the character object, and the area information obtaining processing portion 17 obtains the information on the clothing area from the information of the character object. Note that the information may be obtained as independent information separate from the information on the character object.

The area exposed from the clothing object includes an area not covered by the clothing object in the skin of the character object, an area covered by the clothing object in the case that the character object stands still but exposed from the clothing object in the case that the character object acts or the like (the femoral region exposed in the case that a skirt is turned up, the breast exposed in the case that the neck is opened or the like), for example, and the clothing area is set so as to include at least a part of those areas. Note that the clothing area does not necessarily have to be set in advance but may be set on a real time basis for the character object while a game is played.

The drawing setting processing portion 19 executes drawing setting of the clothing area to first drawing setting for drawing as the skin or to second drawing setting for drawing as the clothing. At this time, the drawing setting processing portion 19 switches the first drawing setting and the second drawings setting by changing at least either one of a color and a texture of the drawing setting of the clothing area. Such a change of the drawing setting is made by changing the setting of a material, a texture, a shader and the like, for example.

The drawing processing portion 20 draws the character object and the clothing object on the basis of the information on the character object obtained by the first object information obtaining processing portion 13, the information of the clothing object obtained by the second object information obtaining processing portion 15, and the drawing setting set by the drawing setting processing portion 19.

FIGS. 3 and 4 illustrate an example of the character object and the clothing object drawn by the drawing processing portion 20. In the example illustrated in FIGS. 3 and 4, a female character 27 (an example of the character object) wears a swimming suit 29 (an example of the clothing object). The swimming suit 29 is a so-called bikini-type swimming suit having a tops 33 worn on a breast portion 31 of the female character 27 and a bottom 37 worn on a waist portion 35 of the female character 27 (including a crotch portion and a buttock portion).

FIGS. 5 and 6 illustrate an example of the information of the clothing area obtained by the area information obtaining processing portion 17. In the example illustrated in FIGS. 5 and 6, a clothing area 39 is set on the breast portion 31 of the female character 27. The clothing area 39 is set to fully cover the whole cleavage of the breasts and a lower part of the breasts, for example. A clothing area 41 is also set to the waist portion 35 of the female character 27. The clothing area 41 is set to cover the entire pelvis from a part below the navel to a part below the crotch, for example. Note that the clothing areas 39 and 41 are illustrated by a one-dot chain line in FIGS. 5 and 6 for convenience of description, but the clothing areas 39 and 41 themselves are not drawn.

Note that the clothing areas do not necessarily have to be set to both the breast portion 31 and the waist portion 35. In the case that the clothing object worn by the character object has more exposure on the upper body but less exposure on the lower body or the like, for example, the clothing area may be set only to the breast portion 31. On the contrary, in the case that the clothing object worn by the character object has more exposure on the lower body but less exposure on the upper body or the like, for example, the clothing area may be set only to the waist portion 35.

Instead of or in addition to the breast portion 31 and the waist portion 35, the clothing area may be set to portions other than them. The clothing area may be set to at least any one of a belly portion, a femoral portion, a cruris portion, a neck portion, a head portion, a shoulder portion, a side portion, an upper arm portion, a front arm portion and the like.

FIGS. 7 and 8 illustrate an example of character display in the case that the drawing setting of the clothing area is set to the second drawing setting (clothing) by the drawing setting processing portion 19. In the example illustrated in FIGS. 7 and 8, a color of each of the clothing areas 39 and 41 is changed from pale pink to black (indicated by hatching in FIGS. 7 and 8), and the texture is changed from the texture of the skin to the texture of a cloth. As a result, since such display that the female character 27 wears clothing (bleached cotton, spats and the like) in close contact with the body under the tops 33 and the bottom 37 of the swimming suit 29 can be made, exposure of the skin of the female character 27 can be reduced. Note that in the case that the drawing setting of the clothing area is set to the first drawing setting (skin) by the drawing setting processing portion 19, the display is made as in FIGS. 3 and 4.

Note that the color in the drawing setting may be changed to those other than black (gray, deep blue, white and the like), and the texture may be changed to the texture other than cloth (plastic, leather, paper and the like). Instead of changing both the color and the texture, only the color or only the texture may be changed.

Returning to FIG. 2, the mode switching instruction reception processing portion 21 receives a mode switching instruction from the player, designating on or off of the low-exposure mode in which exposure of the skin of the character object is reduced. As a result, the player can manually set on or off of the low-exposure mode on a predetermined mode setting screen (a setting screen for battle information which will be described later, for example) by using the controller 5.

The mode switching processing portion 23 switches on/off of the low-exposure mode on the basis of the mode switching instruction. That is, the mode switching processing portion 23 switches the low-exposure mode to on in the case that it receives the mode switching instruction to turn on the low-exposure mode by the mode switching instruction reception processing portion 21 and switches the low-exposure mode to off in the case that it receives the mode switching instruction to turn off the low-exposure mode.

Moreover, the drawing setting processing portion 19 described above sets the drawing setting of the clothing area to the first drawing setting (skin) in the case that the low-exposure mode is turned off by the mode switching processing portion 23 and sets it to the second drawing setting (clothing) in the case that the low-exposure mode is turned on.

Note that a name of the mode in which the exposure of the skin of the character object is reduced may be other than the "low-exposure mode". In the case of delivery of a live video of the game on the Internet or the like, for example, in the case that the exposure of the skin of the character object is to be temporarily restricted by considering that the game is viewed by the general public, the name may be a "delivery mode" or the like. Moreover, in the case of participation of the character object in an online battle game or a battle game of e-sports (electronic sports) or the like, for example, in the case that the exposure of the skin of the character object is to be temporarily restricted by considering attributes (sex, age, nationality, residence and the like) of the player who is an opponent and a possibility that the game is viewed by the general public, the name may be a "battle mode", an "e-sport mode" or the like. Moreover, in the case of making other players to play the game, for example, in the case that the exposure of the skin of the character object is to be temporarily restricted by considering that younger age groups of the other players, the name may be a "kids' play mode" or the like.

The confirmation display processing portion 25 displays confirmation matters for confirming that the exposure of the skin of the character object is reduced in the case that the mode switching instruction to turn on the low-exposure mode is received from the player by the mode switching instruction reception processing portion 21.

FIG. 9 illustrates an example of the display of confirmation matters by the confirmation display processing portion 25. In the example illustrated in FIG. 9, a caution that the exposure of the skin of the character object is to be reduced is given to the player by displaying that the clothing is displayed under the costume of the character by turning on the low-exposure mode, for example. The player can select whether the low-exposure mode is to be turned on or not by selecting either of "Yes" and "No" by using the controller 5. In the case that the player does not mind whether the exposure of the skin of the character object is reduced, the low-exposure mode is switched to on by selecting "Yes". On the other hand, in the case that the player does not like that the exposure of the skin of the character object is reduced, the low-exposure mode stays off by selecting "No".

Note that the processing and the like in each of the processing portions described above are not limited to the example of sharing of the processing but the processing may be executed by a smaller number of the processing portions (one processing portion, for example) or may be executed by more subdivided processing portions. Moreover, the functions of each of the processing portions described above are implemented by a game program executed by a CPU 101 (see FIG. 15 which will be described later) which will be described later, but a part of that may be implemented by actual devices such as a dedicated integrated circuit such as ASIC and FPGA and other electric circuits.

3. Processing Procedure Executed by Information Processing Device

Subsequently, an example of the processing procedure executed by the CPU 101 of the information processing device 3 will be described by using FIGS. 10-12. Here, the processing procedure at the time that the character object is to participate in a battle game such as an online battle game and an e-sports will be described.

As illustrated in FIG. 10, the information processing device 3 displays a main menu screen at Step S10.

At Step S20, the information processing device 3 determines whether a battle mode to participate in a battle game such as an online battle game and e-sports has been selected by the player or not on the main menu screen. In the case that the battle mode is not selected (Step S20: NO), this flow is finished. On the other hand, in the case that the battle mode is selected (Step S20: YES), the routine goes to Step S100.

At Step S100, the information processing device 3 displays a setting screen of battle information, receives an input of various types of the battle information by the player and sets the battle information. The battle information includes a degree of difficulty, a maximum physical strength of the character object, limit time, round number and the like. Moreover, the battle information includes setting of on or off of the low-exposure mode (details will be described later. See FIG. 11).

At Step S30, the information processing device 3 displays an entry screen and receives an input of entry information by the player.

At Step S200, the information processing device 3 displays a character selection screen for selecting a character to participate in the battle game, receives an input by the player, and selects the character. At this time, the drawing setting is switched in accordance with the on or off of the low-exposure mode (details will be described later. See FIG. 12).

At Step S40, the information processing device 3 displays a stage selection screen for selecting a stage where the battle takes place, receives an input by the player and selects the stage.

At Step S50, the information processing device 3 executes a battle between the selected character and a character of an opponent. Note that the opponent may be a character operated by an actual player or may be a character operated by a computer.

At Step S60, the information processing device 3 displays profits obtained by a result of the battle.

At Step S70, the information processing device 3 displays a battle record reflecting the result of the battle.

At Step S80, the information processing device 3 displays a post-battle menu screen. On the post-battle menu screen, the player can make selection among rematch with the same character, rematch by changing the character, return to the main menu screen and the like. Then, this flow is finished.

Subsequently, an example of the processing procedure executed at Step S100 (set battle information) will be described by using FIG. 11.

As illustrated in FIG. 11, at Step S110, the information processing device 3 displays a setting screen of the battle information, receives an input of various types of the battle information by the player and sets the battle information.

At Step S120, the information processing device 3 receives the mode switching instruction designating on or off of the low-exposure mode by an operation input of the player on the setting screen of the battle information by the mode switching instruction reception processing portion 21.

At Step S130, the information processing device 3 determines whether the mode switching instruction received at Step S120 is an instruction to turn on the low-exposure mode or not. In the case that it is an instruction to turn off the low-exposure mode (Step S130: NO), the routine goes to Step S140.

At Step S140, the information processing device 3 turns off the low-exposure mode by the mode switching processing portion 23. Then, the routine goes to Step S30 in FIG. 10.

Note that in the Step S130, in the case that the mode switching instruction received at Step S120 is an instruction to turn on the low-exposure mode (Step S130: YES), the routine goes to Step S150.

At Step S150, the information processing device 3 displays the confirmation matters for confirming that the exposure of the skin of the character object is to be reduced by the confirmation display processing portion 25.

At Step S160, the information processing device 3 determines whether or not "YES" has been selected by the player on the confirmation display displayed at Step S150. In the case that "NO" was selected (Step S160: NO), the routine goes to Step S140, and the low-exposure mode is turned off. On the other hand, in the case that "YES" was selected (Step S160: YES), the routine goes to Step S170.

At Step S170, the information processing device 3 turns on the low-exposure mode by the mode switching processing portion 23. Then, the routine goes to Step S30 in FIG. 10.

Subsequently, an example of the processing procedure executed at Step S200 (selection of a character) will be described by using FIG. 12.

As illustrated in FIG. 12, at Step S210, the information processing device 3 displays a character selection screen for selecting the character object participating in the battle game, receives an input by the player, and selects the character object.

At Step S220, the information processing device 3 obtains information on the character object selected at Step S210 by the first object information obtaining processing portion 13.

At Step S230, the information processing device 3 obtains information on the clothing object worn by the character object selected at Step S210 by the second object information obtaining processing portion 15.

At Step S240, the information processing device 3 obtains information on a clothing area including an area exposed from the clothing object set to the skin of the character object by the area information obtaining processing portion 17.

At Step S250, the information processing device 3 determines whether the low-exposure mode is on or not. In the case that the low-exposure mode is on (Step S250: YES), the routine goes to Step S260.

At Step S260, the information processing device 3 sets the drawing setting of the clothing area to the second drawing setting for drawing as clothing by the drawing setting processing portion 19. As a result, the character object is displayed such that the character object wears the clothing in close contact with the body under the clothing object, and the exposure of the skin is restricted in the display (FIGS. 7 and 8). After that, the routine goes to Step S280 which will be described later.

On the other hand, at Step S250, in the case that the low-exposure mode is off (Step S250: NO), the routine goes to Step S270.

At Step S270, the information processing device 3 sets the drawing setting of the clothing area to the first drawing setting for drawing as the skin by the drawing setting processing portion 19. As a result, the character object is displayed such that the character object wears only the clothing object (FIGS. 3 and 4).

At Step S280, the information processing device 3 draws the character object and the clothing object by the drawing processing portion 20 on the basis of the information on the character object obtained at Step S220, the information on the clothing object obtained at Step S230, and the drawing setting set at Step S260 or Step S270. Then, the routine goes to Step S40 in FIG. 10.

Note that the aforementioned processing procedures are an example, and at least a part of the procedures may be deleted or changed or a procedure other than the above may be added. Moreover, at least a part of an order of the procedures may be changed or a plurality of procedures may be combined into a single procedure.

4. Effect of Embodiment

The game program of this embodiment causes the information processing device 3 to function as the first object information obtaining processing portion 13 for obtaining the information on the character object, the second object information obtaining processing portion 15 for obtaining the information on the clothing object worn by the character object, the area information obtaining processing portion 17 for obtaining the information on the clothing area including the area exposed from the clothing object set to the skin of the character object, the drawing setting processing portion 19 for setting the drawing setting of the clothing area to the first drawing setting for drawing it as the skin or the second drawing setting for drawing it as the clothing, and the drawing processing portion 20 for drawing the character object and the clothing object on the basis of the information on the character object, the information on the clothing object, and the drawing setting.

In the game of this embodiment, the character object wearing the clothing object is drawn. Here, in the case that the clothing object is a swimming suit, an underwear or a costume with much exposure, for example, the exposure of the skin of the character object may be desirably restricted temporarily by considering the viewing by the general public, the attributes (sex, age, nationality, residence and the like) of the player who is an opponent, age groups of the other players and the like in the case that the live video of the game is delivered on the Internet or the like, in the case that the character object is made to participate in the battle game such as an online battle game and the e-sports and in the case that the other players are made to play the game, for example.

In this embodiment, the clothing area including the area exposed from the clothing object is set to the skin of the character object, and the drawing setting of the clothing area is switched from the first drawing setting to the second drawing setting, whereby a part of the skin exposed from the clothing object of the character object can be drawn as a clothing. As a result, the character object can be displayed such that the character object wears the clothing (spats, bleached cotton and the like) in close contact with the body under the clothing object and thus, the exposure of the skin of the character object can be temporarily restricted. Moreover, by switching the drawing setting of the clothing area from the second drawing setting to the first drawing setting, the character object can be returned to an original drawing with much exposure of the skin.

As described above, in this embodiment, since the exposure of the skin is reduced by switching the drawing setting of a partial area of the skin, a development cost and the number of development processes of the game can be reduced as compared with a change of the clothing by preparing another clothing object with less exposure, for example, and a processing load of the processor (the CPU101, a GPU 106 and the like) of the information processing device 3 can be also reduced.

Moreover, the clothing object worn by the character object may be obtained by the player by consuming a large labor in the game or purchased by bearing a cost, and liking and preferences of the player may often be reflected. Therefore, in the case that the clothing object is changed to another one with less exposure, a degree of satisfaction of the player is lowered, and an appeal of the game is reduced. In this embodiment, the display is made such that the clothing in close contact with the body is worn under the clothing object by switching the drawing setting of the clothing area on the skin and thus, the exposure of the skin can be restricted while the clothing object is not hidden but kept drawn. Therefore, lowering of the degree of satisfaction of the player or the appeal of the game can be prevented.

Moreover, particularly in this embodiment, the drawing setting processing portion 19 switches between the first drawing setting and the second drawing setting by changing both the color and the texture of the drawing setting of the clothing area. As a result, in the case that the exposure of the skin of the character object is to be restricted, the clothing area on the skin can be drawn as real clothing.

Moreover, particularly in this embodiment, the game program causes the information processing device 3 to further function as the mode switching instruction reception processing portion 21 which receives the mode switching instruction from the player for turning on or off the low-exposure mode in which the exposure of the skin of the character object is reduced and the mode switching processing portion 23 for switching on or off of the low-exposure mode on the basis of the mode switching instruction, and the drawing setting processing portion 19 sets the drawing setting of the clothing area to the first drawing setting in the case that the low-exposure mode is turned off and to the second drawing setting in the case that the low-exposure mode is turned on.

As a result, by switching on or off of the low-exposure mode, the player can arbitrarily execute restriction on the exposure of the skin of the character object or return to the original exposure state. Therefore, convenience for the player can be improved.

Moreover, in the case that the character object is to participate in the e-sports, for example, the exposure of the skin of the character object may be preferably restricted by considering that the game is viewed by the general public at a venue and the live video are delivered on the Internet and the like. Particularly, in the case that the event is held in foreign countries, regulation on the exposure of the skin of the character object may be stricter than in Japan depending on the country or region, and the exposure of the skin of the character object may be restricted more preferably.

Thus, in this embodiment, the exposure of the skin of the character object can be temporarily restricted only during participation in the e-sports by turning on the low-exposure mode by the player. As a result, the player can allow the character object to participate at ease and can concentrate on the battle play.

Moreover, in the case that the character object is to participate in the online battle game or the like, for example, the exposure of the skin of the character object may be preferably restricted depending on the attributes (sex, age, nationality, residence and the like) of the player who is an opponent. In the case that the opponent player is female or in a young age group, for example, the exposure of the skin of the character object is preferably restricted. Moreover, in the case that the nationality or the residence of the opponent player is overseas, regulation on the exposure of the skin of the character object may be stricter than in Japan depending on the country or region, and in that case the exposure of the skin of the character object is restricted more preferably.

Thus, in this embodiment, the exposure of the skin of the character object can be temporarily restricted only during participation in the battle game by turning on the low-exposure mode by the player. As a result, the player can allow the character object to participate at ease and can concentrate on the battle play.

Moreover, in the case that the game according to this embodiment is to be played by another player, for example, in the case that the age group of the other player is young (in the case that a parent allows a child to play the game, for example), the exposure of the skin of the character object may be temporarily restricted desirably. Thus, in this embodiment, the exposure of the skin of the character object can be temporarily restricted only while the other player is playing by turning on the low-exposure mode by the player. As a result, the player can allow the other player to play the game at ease.

Moreover, particularly in this embodiment, the game program causes the information processing device 3 to further function as the confirmation display processing portion 25 for making display which confirms that the exposure of the skin of the character object is reduced in the case that the mode switching instruction to turn on the low-exposure mode is received from the player.

As a result, at the time the player switching the low-exposure mode to on, a caution can be given to the player that the exposure of the skin of the character object is reduced (the clothing is displayed under the costume). As a result, a more careful operation is requested to the player, and unintended switching to turn on the low-exposure mode by a wrong operation or the like can be prevented.

Moreover, particularly in this embodiment, the character object is the female character 27, and the area information obtaining processing portion 17 obtains the information on the clothing areas 39 and 41 set to both the breast portion 31 and the waist portion 35 of the female character 27.

As a result, physical expression specific to a female character can be restricted, and an effect of suppressing the exposure of the skin can be further improved.

5. Variation and the Like

Note that the present invention is not limited to the aforementioned embodiment but is capable of various variations within a range not departing from the spirit and the technical idea thereof.

(5-1. Case with on/Off of Low-Exposure Mode Automatically Switched)

In the aforementioned embodiment, the case in which the player manually switches on or off of the low-exposure mode is described, but the low-exposure mode may be configured to be switched automatically. Details of this variation will be described below.

FIG. 13 illustrates an example of functional configuration of an information processing device 3A according to this variation. Note that in FIG. 13, the same reference numerals are given to portions similar to those in the aforementioned FIG. 2, and the description will be omitted as appropriate.

As illustrated in FIG. 13, the information processing device 3A has a player information obtaining processing portion 43 instead of the aforementioned mode switching instruction reception processing portion 21 and the confirmation display processing portion 25.

The player information obtaining processing portion 43 obtains player information on a battle opponent in the case that the character object is to participate in the battle game. The player information is account information for using the online battle game by the player or the like, for example, and includes attribute information of the opponent player such as a sex, an age, a residence and a nationality. Note that instead of or in addition to these items, other items may be included. Moreover, in the case that there is a face image of the opponent player besides the account information, for example, the image may be obtained, and the sex, the age and the like may be obtained by image recognition processing.

The drawing setting processing portion 19 sets the drawing setting of the clothing area to the first drawing setting or to the second drawing setting on the basis of the obtained player information. More specifically, the mode switching processing portion 23 switches on or off of the low-exposure mode on the basis of the obtained player information. For example, the mode switching processing portion 23 switches the low-exposure mode to ON in the case that the opponent player is female, in the case that the opponent player is at a predetermined age (16 years old, for example) or younger, in the case that the residence or the nationality of the opponent player is of a country or a region where regulation on the game expression is strict or the like. On the other hand, the mode switching processing portion 23 switches the low-exposure mode to OFF in the case that the opponent player is male, in the case that the opponent player is at a predetermined age (17 years old, for example) or older, in the case that the residence or the nationality of the opponent player is not of a country or a region where regulation on the game expression is strict or the like.

The drawing setting processing portion 19 sets the drawing setting of the clothing area to the first drawing setting (skin) in the case that the low-exposure mode is turned off by the mode switching processing portion 23 and to the second drawing setting (clothing) in the case that the low-exposure mode is turned on.

Since configuration other than the above of the information processing device 3A is similar to that of the aforementioned information processing device 3, the description will be omitted.

FIG. 14 illustrates an example of the processing procedures executed by the CPU 101 of the information processing device 3A according to this variation. Note that in the processing procedures of this variation, a portion different from the aforementioned embodiment is only the setting processing of the battle information and similar to the aforementioned embodiment except that Step S100 (setting of the battle information) in the processing procedures illustrated in the aforementioned FIGS. 10 to 12 is replaced with Step S400 (setting of the battle information).

As illustrated in FIG. 14, at Step S410, similarly to Step S110, the information processing device 3A displays the setting screen of the battle information and sets the battle information by receiving an input of various types of the battle information by the player.

At Step S420, the information processing device 3A obtains the player information of the battle opponent by the player information obtaining processing portion 43.

At Step S430, the information processing device 3A determines whether the opponent player is female or not on the basis of the player information obtained at Step S420. In the case that the opponent player is female (Step S430: YES), the routine goes to Step S440.

At Step S440, the information processing device 3A turns on the low-exposure mode by the mode switching processing portion 23. Then, the routine goes to Step S30 in FIG. 10.

On the other hand, at Step S430, in the case that the opponent player is male (Step S430: NO), the routine goes to Step S450.

At Step S450, the information processing device 3A determines whether the age of the opponent player is at a predetermined age (16 years, for example) or younger or not on the basis of the player information obtained at Step S420. In the case that the opponent player is at the predetermined age or younger (Step S450: YES), the routine goes to Step S440, and the low-exposure mode is turned on. On the other hand, in the case that the opponent player is older than the predetermined age (Step S450: NO), the routine goes to Step S460.

At Step S460, the information processing device 3A determines whether the residence or the nationality of the opponent player is of a country or a region where regulation on the game expression is strict or not on the basis of the player information obtained at Step S420. In the case that it is of the country or the region where regulation is strict (Step S460: YES), the routine goes to Step S440, and the low-exposure mode is turned on. On the other hand, in the case that it is not of the country or the region where regulation is strict (Step S460: NO), the routine goes to Step S470.

At Step S470, the information processing device 3A turns off the low-exposure mode by the mode switching processing portion 23. Then, the routine goes to Step S30 in FIG. 10.

Note that the aforementioned processing procedures are an example, and at least a part of the procedures may be deleted or changed or the procedure other than the above may be added. Moreover, an order of at least a part of the procedures may be changed or a plurality of procedures may be combined into a single procedure.

According to this variation described above, the player information of the battle opponent is obtained, and the drawing setting of the clothing area is automatically set to the first drawing setting or to the second drawing setting on the basis of the obtained player information. As a result, since the exposure of the skin of the character object can be temporarily restricted only while participating in the battle game in accordance with the attribute of the opponent player, the player can cause the character object to participate at ease and can concentrate on the battle play. Moreover, since a labor for manually switching on/off of the low-exposure mode can be saved, and a failure to switch the mode or the like can be prevented, convenience of the player can be improved.

(5-2. Others)

In the above, only one kind of the clothing (hereinafter, referred to as "skin covering clothing" as appropriate) drawn by setting the clothing area to the second drawing setting was described, but in the case that there is a plurality of character objects, the types of the skin covering clothing (size, shape, color, pattern, material and the like) may be made different for each character object.

Moreover, a plurality of types of the skin covering clothing may be set, for example, so that the player can select desired clothing from them. In this case, the player may select the type of skin covering clothing in accordance with the costume of the character object, for example, or may select the type of skin covering clothing in accordance with the venue of the event in the case that the player participates in the e-sports, for example (to select the skin covering clothing with less exposure in accordance with strictness of regulation or the like).

Moreover, in the case that the player information is to be obtained as in the aforementioned variation, the type of the skin covering clothing may be automatically selected in accordance with the age or residence of the opponent player (to select the skin covering clothing with less exposure in accordance with the age or strictness of regulation).

Techniques by the embodiment and each modified example may be appropriately combined and utilized in addition to the examples having already described above. Although exemplification is not performed one by one, the embodiment and each modified example are carried out by various changes being applied thereto without departing from the technical idea of the present invention.

6. Hardware Configuration of the Information Processing Device

An exemplary hardware configuration will be described for the information processing device 3, 3A achieving the processing parts implemented by a program executed by the CPU 101 described above, with reference to FIG. 15.

As shown in FIG. 15, the information processing device 3, 3A has the circuitry including a CPU 101, a ROM 103, a RAM 105, a GPU 106, a dedicated integrated circuit 107 constructed for specific use such as an ASIC or an FPGA, an input device 113, an output device 115, a storage device 117, a drive 119, a connection port 121, and a communication device 123. These constituent elements are mutually connected via a bus 109 and an input/output (I/O) interface 111 such that signals can be transferred.

The game program can be recorded in a ROM 103, the RAM 105, and the storage device 117, for example.

The game program can also temporarily or permanently (non-transitory) be recorded in a removable recording medium 125 such as magnetic disks including flexible disks, various optical disks including CDs, MO disks, and DVDs, and semiconductor memories. The recording medium 125 as described above can be provided as so-called packaged software. In this case, the game program recorded in the recording medium 125 may be read by the drive 119 and recorded in the storage device 117 through the I/O interface 111, the bus 109, etc.

The game program may be recorded in, for example, a download site, another computer, or another recording medium (not shown). In this case, the game program is transferred through a network NW such as a LAN and the Internet and the communication device 123 receives this program. The program received by the communication device 123 may be recorded in the storage device 117 through the I/O interface 111, the bus 109, etc.

The game program may be recorded in appropriate external connection device 127, for example. In this case, the game program may be transferred through the appropriate connection port 121 and recorded in the storage device 117 through the I/O interface 111, the bus 109, etc.

The CPU 101 executes various process in accordance with the program recorded in the storage device 117 to implement the processes of the area information obtaining processing portion 17, the drawing setting processing portion 19, etc. In this case, the CPU 101 may directly read and execute the program from the storage device 117 or may be execute the program once loaded in the RAM 105. In the case that the CPU 101 receives the program through, for example, the communication device 123, the drive 119, or the connection port 121, the CPU 101 may directly execute the received program without recording in the storage device 117.

The CPU 101 may execute various processes based on a signal or information input from the input device 113 such as the controller 5 described above, a mouse, a keyboard, and a microphone as needed.

The GPU 106 executes processes for displaying images such as a rendering processing based on a command of the CPU 101.

The CPU 101 and the GPU 106 may output a result of execution of the process from the output device 115 such as the display device 7, for example. And the CPU 101 and the GPU 106 may transmit this process result to the communication device 123 or the connection port 121 as needed or may record the process result into the storage device 117 or the recording medium 125.

What is claimed is:

1. A game processing method executed by an information processing device, comprising:
    obtaining information on a character object;
    obtaining information on a clothing object worn by the character object;
    obtaining information on clothing area including an area exposed from the clothing object, the clothing area being set to skin of the character object;
    setting drawing setting of the clothing area to first drawing setting for drawing as the skin or to second drawing setting for drawing as clothing; and
    drawing the character object and the clothing object based on the information on the character object, the information on the clothing object, and the drawing setting,
    wherein the setting the drawing setting of the clothing area comprises switching between the first drawing setting and the second drawing setting by changing at least one of a color and a texture of the drawing setting of the clothing area.

2. The game processing method according to claim 1, further comprising:
    receiving a mode switching instruction for turning on or off a low-exposure mode in which exposure of the skin of the character object is reduced from a player; and
    switching on or off of the low-exposure mode based on the mode switching instruction,
    wherein the setting the drawing setting of the clothing area comprises setting the drawing setting of the clothing area to the first drawing setting in the case that the low-exposure mode is turned off and to the second drawing setting in the case that the low-exposure mode is turned on.

3. The game processing method according to claim 2, further comprising:
    displaying a display which confirms that the exposure of the skin of the character object is reduced in the case that the mode switching instruction to turn on the low-exposure mode is received from the player.

4. The game processing method according to claim 1, further comprising:
    obtaining player information of a battle opponent in the case that the character object is to participate in a battle game,
    wherein the setting the drawing setting of the clothing area comprises setting the drawing setting of the clothing area to the first drawing setting or to the second drawing setting based on the player information.

5. The game processing method according to claim 1, wherein the character object is a female character object, and
    wherein the obtaining the information on the clothing area comprises obtaining the information on the clothing area set to at least one of a breast portion and a waist portion of the female character object.

6. A non-transitory recording medium readable by an information processing device, the recording medium storing a game program programmed to cause the information processing device to:
    obtain information on a character object;
    obtain information on a clothing object worn by the character object;
    obtain information on clothing area including an area exposed from the clothing object, the clothing area being set to skin of the character object;
    set drawing setting of the clothing area to first drawing setting for drawing as the skin or to second drawing setting for drawing as clothing; and
    draw the character object and the clothing object based on the information on the character object, the information on the clothing object, and the drawing setting,
    wherein the setting the drawing setting of the clothing area comprises switching between the first drawing setting and the second drawing setting by changing at least one of a color and a texture of the drawing setting of the clothing area.

7. The recording medium according to claim 6,
    wherein the game program is further programmed to cause the information processing device to receive a mode switching instruction for turning on or off a low-exposure mode in which exposure of the skin of the character object is reduced from a player,
    wherein the game program is further programmed to cause the information processing device to switch on or off of the low-exposure mode based on the mode switching instruction, and
    wherein the setting the drawing setting of the clothing area comprises setting the drawing setting of the clothing area to the first drawing setting in the case that the low-exposure mode is turned off and to the second drawing setting in the case that the low-exposure mode is turned on.

8. The recording medium according to claim 7,
    wherein the game program is further programmed to cause the information processing device to display a display which confirms that the exposure of the skin of the character object is reduced in the case that the mode switching instruction to turn on the low-exposure mode is received from the player.

9. The recording medium according to claim 6,
    wherein the game program is further programmed to cause the information processing device to obtain player information of a battle opponent in the case that the character object is to participate in a battle game, and
    wherein the setting the drawing setting of the clothing area comprises setting the drawing setting of the clothing area to the first drawing setting or to the second drawing setting based on the player information.

10. The recording medium according to claim 6,
    wherein the character object is a female character object, and
    wherein the obtaining the information on the clothing area comprises obtaining the information on the clothing area set to at least one of a breast portion and a waist portion of the female character object.

* * * * *